United States Patent
Li et al.

(10) Patent No.: US 7,432,432 B2
(45) Date of Patent: Oct. 7, 2008

(54) SYSTEM AND METHOD FOR RECOGNIZING HANDWRITTEN MUSIC NOTATIONS

(75) Inventors: Yantao Li, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 663 days.

(21) Appl. No.: 11/087,617

(22) Filed: Mar. 24, 2005

(65) Prior Publication Data
US 2006/0062462 A1    Mar. 23, 2006

Related U.S. Application Data

(60) Provisional application No. 60/611,839, filed on Sep. 21, 2004.

(51) Int. Cl.
G09B 15/02    (2006.01)
(52) U.S. Cl. .................. 84/483.2; 84/477 R; 84/478; 84/470 R; 84/475
(58) Field of Classification Search .................. None
See application file for complete search history.

(56) References Cited

U.S. PATENT DOCUMENTS

| 5,146,833 | A | * | 9/1992 | Lui | ............................... | 84/462 |
|---|---|---|---|---|---|---|
| 5,665,927 | A | * | 9/1997 | Taki et al. | ..................... | 84/609 |
| 6,072,114 | A | * | 6/2000 | Kunimasa | .................. | 84/477 R |
| 6,348,648 | B1 | * | 2/2002 | Connick, Jr. | .............. | 84/477 R |
| 6,538,187 | B2 | * | 3/2003 | Beigi | ........................... | 84/475 |

OTHER PUBLICATIONS

Kruskal, Joseph B., "Chapter One, An Overview of Sequence Comparison,", Time Warps, String Edits, and Macromolecules: The Theory and Practice of Sequence Comparison, pp. 1-44.
Chu, Selina, Keogh, Eamonn, Hart, David, and Pazzani, Michael, "Iterative Deepening Dynamic Time Warping for Time Series," In proceedings of the 2002 IEEE International Conference on Data Mining Maebashi City, Japan, Dec. 9-12, 2002, 18 pages.
Luzeaux, D., "String Distances," Distancia92, Rennes, France, 1992, pp. 1-5.
Sklansky, Jack and Gonzalez, Victor, "Fast Polygonal Approximation Of Digitized Curves," Pattern Recognition, (1980), pp. 327-331, vol. 12, No. 5, Pergamon Press, Oxford.
Sezgin, Tevfik Metin, Stahovich, Thomas, and Davis, Randall, "Sketch Based Interfaces: Early Processing for Sketch Understanding," Proceedings of the 2001 Workshop on Perceptual User Interface, May 2001, pp. 623-641, Orlando, Florida.
Forsberg, Andrew, Dieterich, Mark, and Zeleznik, Robert, "The Music Notepad," In Proceedings of the ACM Symposium on User Interface and Software Technology (UIST). ACM, ACM Press, New York, NY, Nov. 1998, pp. 203-220.

* cited by examiner

Primary Examiner—Marlon T Fletcher
(74) Attorney, Agent, or Firm—Perkins Coie LLP

(57) ABSTRACT

A method and system for recognizing handwritten music notations is described. The method includes steps of recognizing notations within a notation category and receiving a plurality of input strokes corresponding to handwritten music notations. Nearby strokes may be grouped to a first input stroke of the plurality of input strokes to make a stroke set and the stroke set is compared with the notations in the notation category. A determination is made as to whether the stroke set is recognized as at least one candidate notation within the notation category, a candidate list of recognized candidate notations is provided, and a music score is generated based upon the recognized candidate notations.

13 Claims, 19 Drawing Sheets

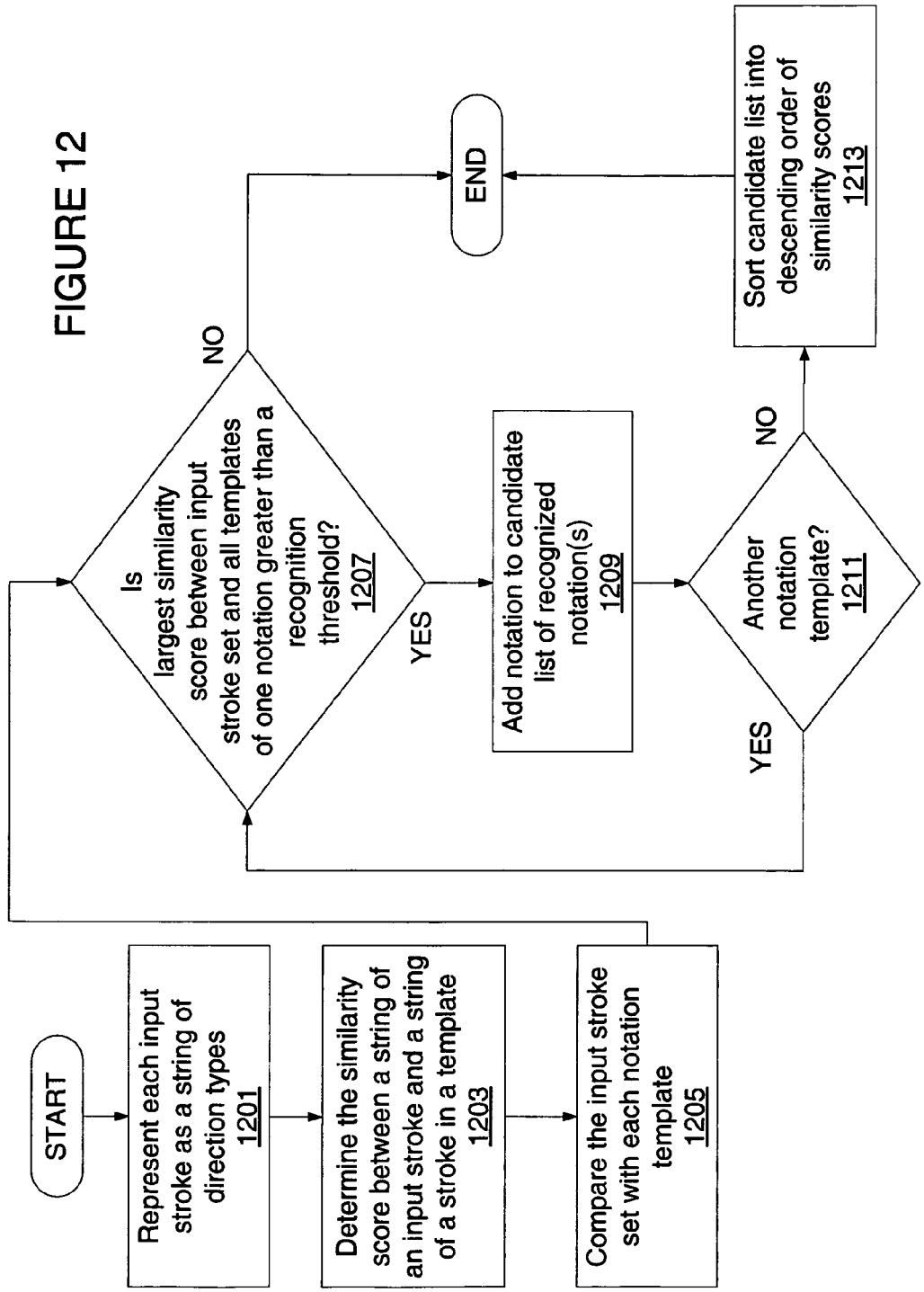

SYSTEM AND METHOD FOR RECOGNIZING HANDWRITTEN MUSIC NOTATIONS

FIELD OF THE INVENTION

Aspects of the present invention are directed generally to handwritten notation systems. More particularly, aspects of the present invention are directed to a method and system for recognizing handwritten music notes using a computer system.

BACKGROUND OF THE INVENTION

The advent of the computer has boomed to a point of prolific use in a variety of different areas. Computers are used throughout the world for everything from controlling speed and direction in a vehicle, to making an online order for a new product, to allowing a young child to learn how to count or read. Within the business industry, the use of the computer has greatly increased the efficiency for performing tasks.

The evolution of computing devices, from data crunching devices that occupied entire floors of large office facilities, to laptop computers or other portable computing devices has dramatically impacted the manner in which documents are generated and information is stored. Portable computing capabilities have enabled individuals to type letters, draft memorandum, take notes, create images, and perform numerous tasks in places other than the office using these computing devices. Professionals and nonprofessionals alike are empowered to perform tasks while on the move using devices that fulfill their computing needs in any location.

With the advent of laptop computers and high-capacity personal data assistants, the office workspace has been expanded to include a variety of non-traditional venues in which work is accomplished. To an increasing degree, computer users must become masters of the divergent user interfaces for each of their computing devices. From a mouse and keyboard interface for the standard personal computer to the simplified resistive stylus interface of personal data assistants and even to the minimalistic keys of a cellular telephone, a user is confronted with a variety of different user interfaces that one needs to master before he can use the underlying technology.

Despite the advances in technology, most users tend to use documents printed on paper as their primary editing tool. Some advantages of printed paper include its readability and portability. Others include the ability to share annotated paper documents and the ease at which one can archive printed paper. One user interface that is bridging the gap between advanced computing systems and the functionality of printed paper is a stylus-based user interface. One approach for the stylus-based user interface is to use resistive technology (common in today's PDAs). Another approach is to use active sensors in a laptop computer.

One type of computer system in this area is a handwritten notation system. Handwritten notation systems allow a user to write words and letters in handwritten strokes while a computing system recognizes the strokes to form the intended words. With modern hardware and software, a user can write directly on her computer using an ink input. Many on-line handwriting recognition methods have been proposed in different character sets such as alphabets, digits, Chinese character set, and mathematical character sets. However, there is a real market need for methods and apparatuses that are designed for other types of symbol recognition.

SUMMARY OF THE INVENTION

There exists a need for the ability to recognize handwritten music notations to create a music score for playback by a computer. Aspects of the present invention provide a method including steps of recognizing notations within a notation category, receiving a plurality of input strokes corresponding to handwritten music notations, grouping at least one nearby stroke to a first input stroke of the plurality of input strokes to make a stroke set, comparing the stroke set with the notations in the notation category, determining whether the stroke set is recognized as at least one candidate notation within the notation category, providing a candidate list of recognized candidate notations, and generating a music score based upon the recognized candidate notations.

Another aspect of the present invention provides a system for recognizing handwritten music notations including a stroke sorter component configured to sort input strokes into an order, a category recognizer component configured to recognize notations within a category of music notations, a stroke grouping component configured to group an input stroke with nearby strokes into a stroke set, a notation recognizer component configured to compare the stroke set with notations within a category to determine whether the stroke set is recognized as a candidate notation and to generate a list of candidate notations, and a music score generation component configured to generate a music score based upon the list. The notation recognizer component may include a direct recognizer subsystem configured to compare the stroke set against notations with stems to generate the list. The notation recognizer component also may include a template matching recognizer subsystem configured to compare the stroke set against all other notations to generate the list.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

FIG. 12 is a flowchart of another illustrative example of a method for recognizing handwritten music notations in accordance with at least one aspect of the present invention.

DETAILED DESCRIPTION OF ILLUSTRATIVE EMBODIMENTS

In the following description of various illustrative embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope of the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing system environment 100 be interpreted as having any dependency nor requirement relating to any one or combination of components illustrated in the exemplary computing system environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 1A:
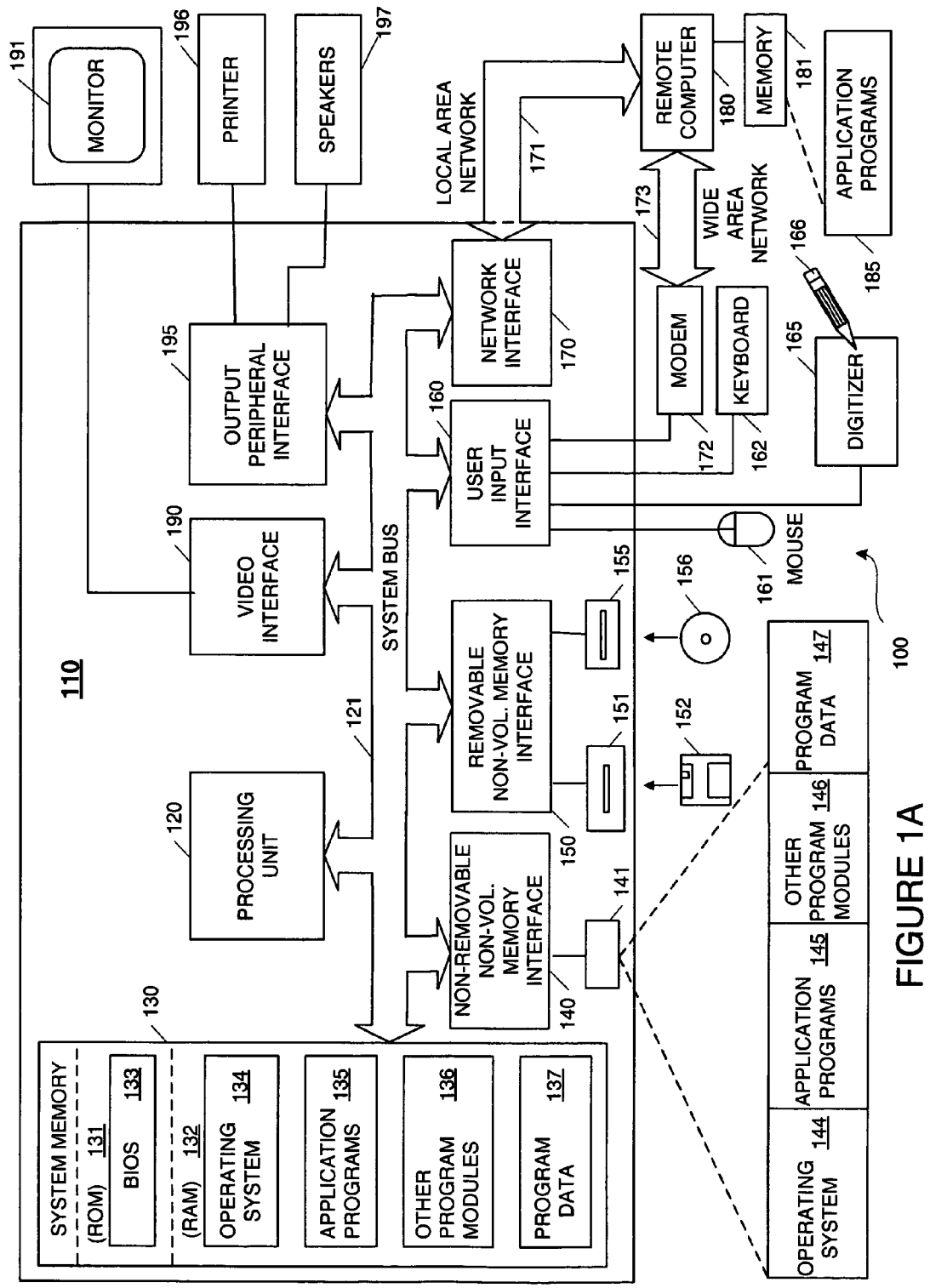
FIG. 1A illustrates a schematic diagram of a general-purpose digital computing environment in which certain aspects of the present invention may be implemented.

With reference to FIG. 1A, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1A illustrates operating system 134, application programs 135, other program modules 136, and program data 137.

The computer 110 may also include other removable/non-removable, volatile/nonvolatile computer storage media. By way of example only, FIG. 1A illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media discussed above and illustrated in FIG. 1A, provide storage of computer readable instructions, data structures, program modules and other data for the computer 110. In FIG. 1A, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a digital camera (not shown), a keyboard 162, and pointing device 161, commonly referred to as a mouse, trackball or touch pad. Other input devices (not shown) may include a pen, stylus and tablet, microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. A digitizer 165 and accompanying pen or stylus 166 are provided in order to digitally capture freehand input. Although a direct connection between the pen digitizer 165 and the user input interface 160 is shown, in practice, the digitizer 165 may be coupled to the processing unit 120 directly, via a parallel port or other interface and the system bus 121 as known in the art. Furthermore, although the digitizer 165 is shown apart from the monitor 191, the usable input area of the digitizer 165 may be co-extensive with the display area of the monitor 191. Further still, the digitizer 165 may be integrated in the monitor 191, or may exist as a separate device overlaying or otherwise appended to the monitor 191.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1A. The logical connections depicted in FIG. 1A include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1A illustrates remote application programs 185 as residing on memory device 181. It will be appreciated that the network connections shown are exemplary and other means of establishing a communications link between the computers may be used.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 1C:
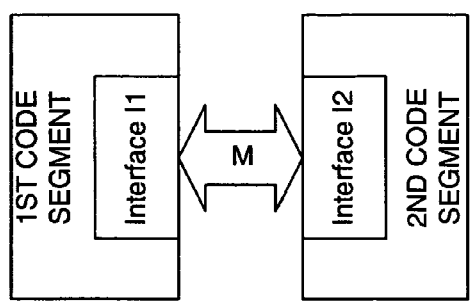
FIGS. 1B through 1M show a general-purpose computer environment supporting one or more aspects of the present invention.
Figure 1E:
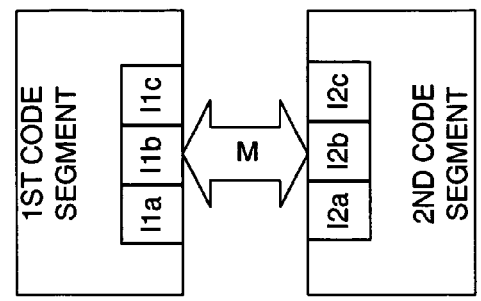
Figure 1B:
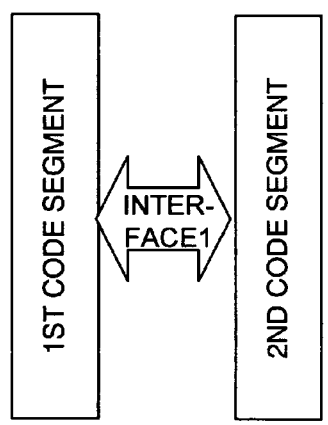

Notionally, a programming interface may be viewed generically, as shown in FIG. 1B or FIG. 1C. FIG. 1B illustrates an interface Interface1 as a conduit through which first and second code segments communicate. FIG. 1C illustrates an interface as comprising interface objects I1 and I2 (which may or may not be part of the first and second code segments), which enable first and second code segments of a system to communicate via medium M. In the view of FIG. 1C, one may consider interface objects I1 and I2 as separate interfaces of the same system and one may also consider that objects I1 and I2 plus medium M comprise the interface. Although FIGS. 1B and 1C show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 1B and 1C, but they nonetheless perform a similar function to accomplish the same overall result. We will now briefly describe some illustrative alternative implementations of a programming interface.

A. Factoring

Figure 1D:
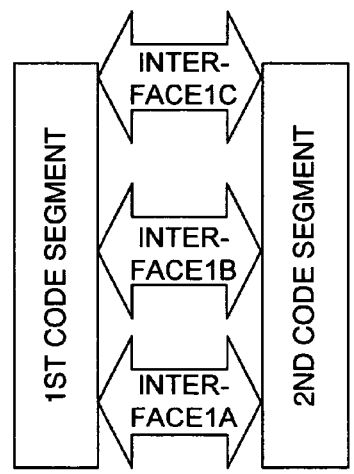

A communication from one code segment to another may be accomplished indirectly by breaking the communication into multiple discrete communications. This is depicted schematically in FIGS. 1D and 1E. As shown, some interfaces can be described in terms of divisible sets of functionality. Thus, the interface functionality of FIGS. 1B and 1C may be factored to achieve the same result, just as one may mathematically provide 24, or 2 times 2 times 3 times 2. Accordingly, as illustrated in FIG. 1D, the function provided by interface Interface1 may be subdivided to convert the communications of the interface into multiple interfaces Interface1A, Interface1B, Interface1C, etc. while achieving the same result. As illustrated in FIG. 1E, the function provided by interface I1 may be subdivided into multiple interfaces I1$a$, I1$b$, I1$c$, etc. while achieving the same result. Similarly, interface I2 of the second code segment which receives information from the first code segment may be factored into multiple interfaces I2$a$, I2$b$, I2$c$, etc. When factoring, the number of interfaces included with the 1st code segment need not match the number of interfaces included with the 2nd code segment. In either of the cases of FIGS. 1D and 1E, the functional spirit of interfaces Interface1 and I1 remain the same as with FIGS. 1B and 1C, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 1G:
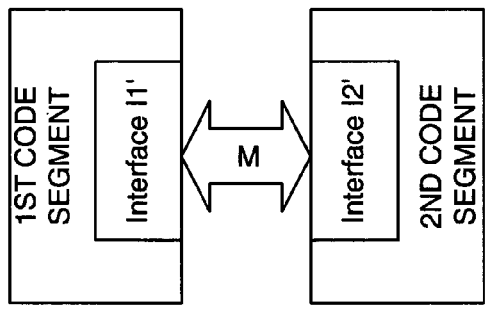
Figure 1I:
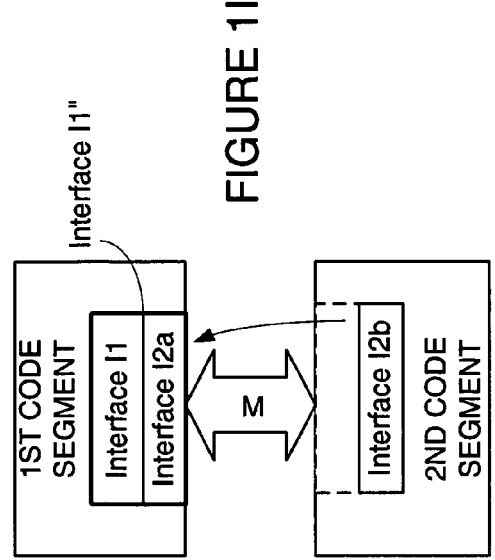
Figure 1F:
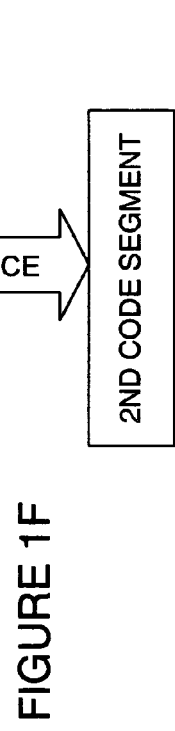

In some cases, it may be possible to ignore, add or redefine certain aspects (e.g., parameters) of a programming interface while still accomplishing the intended result. This is illustrated in FIGS. 1F and 1G. For example, assume interface Interface1 of FIG. 1B includes a function call Square (input, precision, output), a call that includes three parameters, input, precision and output, and which is issued from the 1st Code Segment to the 2nd Code Segment. If the middle parameter precision is of no concern in a given scenario, as shown in FIG. 1F, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 1G, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, which are not needed for some purpose, and so they may be ignored or redefined, or processed elsewhere for other purposes.

C. Inline Coding

Figure 1H:
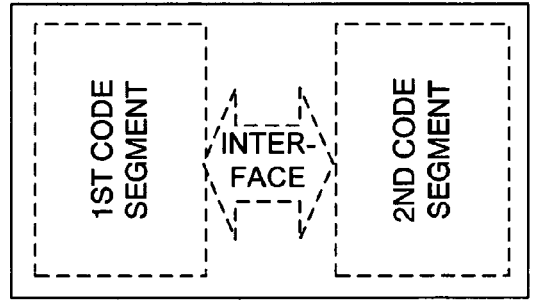

It may also be feasible to merge some or all of the functionality of two separate code modules such that the "interface" between them changes form. For example, the functionality of FIGS. 1B and 1C may be converted to the functionality of FIGS. 1H and 1I, respectively. In FIG. 1H, the previous 1st and 2nd Code Segments of FIG. 1B are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 1I, part (or all) of interface I2 from FIG. 1C may be written inline into interface I1 to form interface I1". As illustrated, interface I2 is divided into I2$a$ and I2$b$, and interface portion I2$a$ has been coded in-line with interface I1 to form interface I1". For a concrete example, consider that the interface I1 from FIG. 1C performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

D. Divorce

Figure 1K:
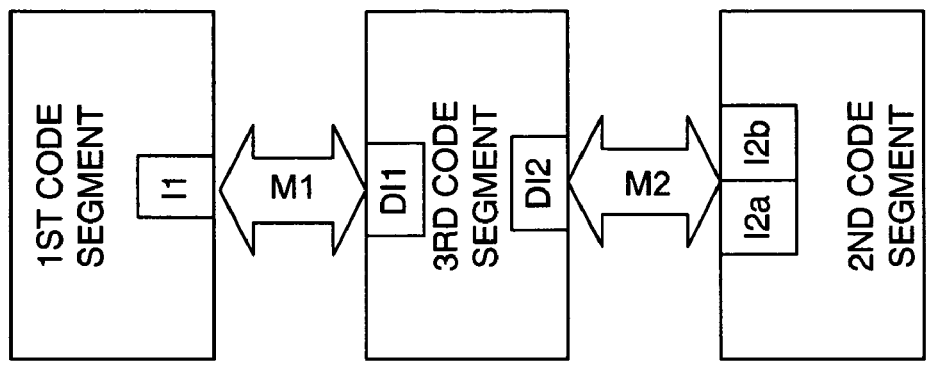
Figure 1J:
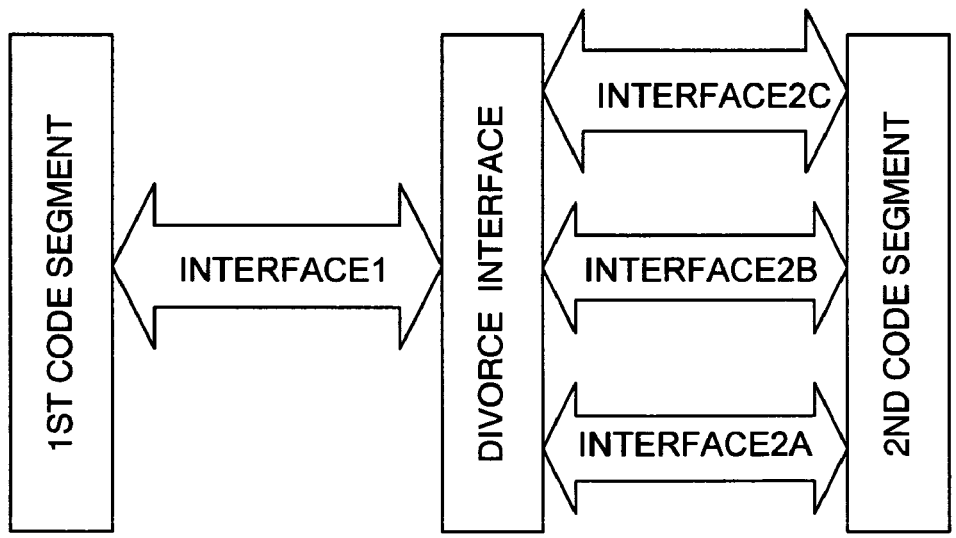

A communication from one code segment to another may be accomplished indirectly by breaking the communication into multiple discrete communications. This is depicted schematically in FIGS. 1J and 1K. As shown in FIG. 1J, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the 2nd Code Segment is changed such that it is no longer compatible with the interface used by the 1st Code Segment, and so an intermediary is used to make the old and new interfaces compatible. Similarly, as shown in FIG. 1K, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 1C to a new operating system, while providing the same or similar functional result.

E. Rewriting

Figure 1L:
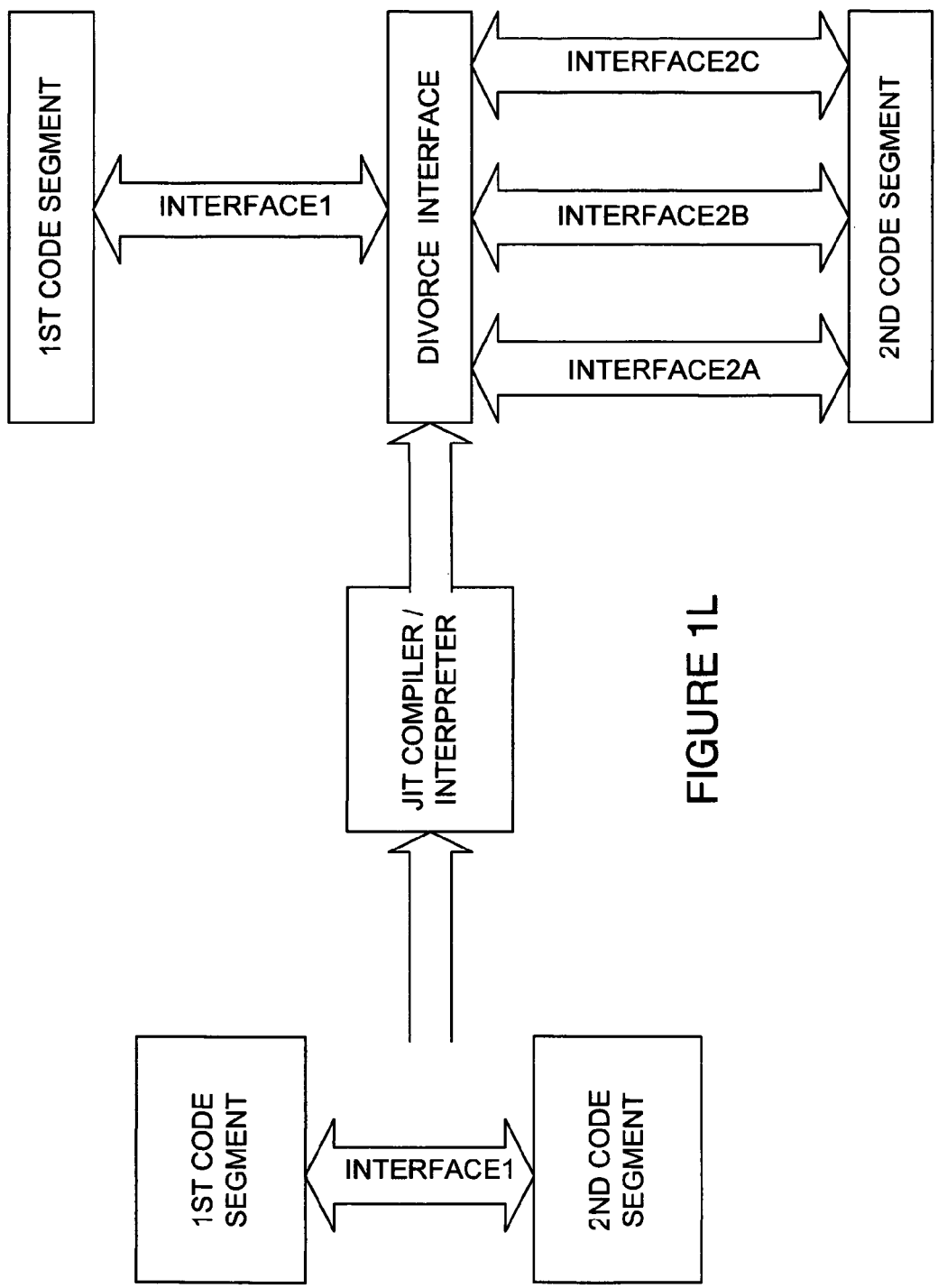
Figure 1M:
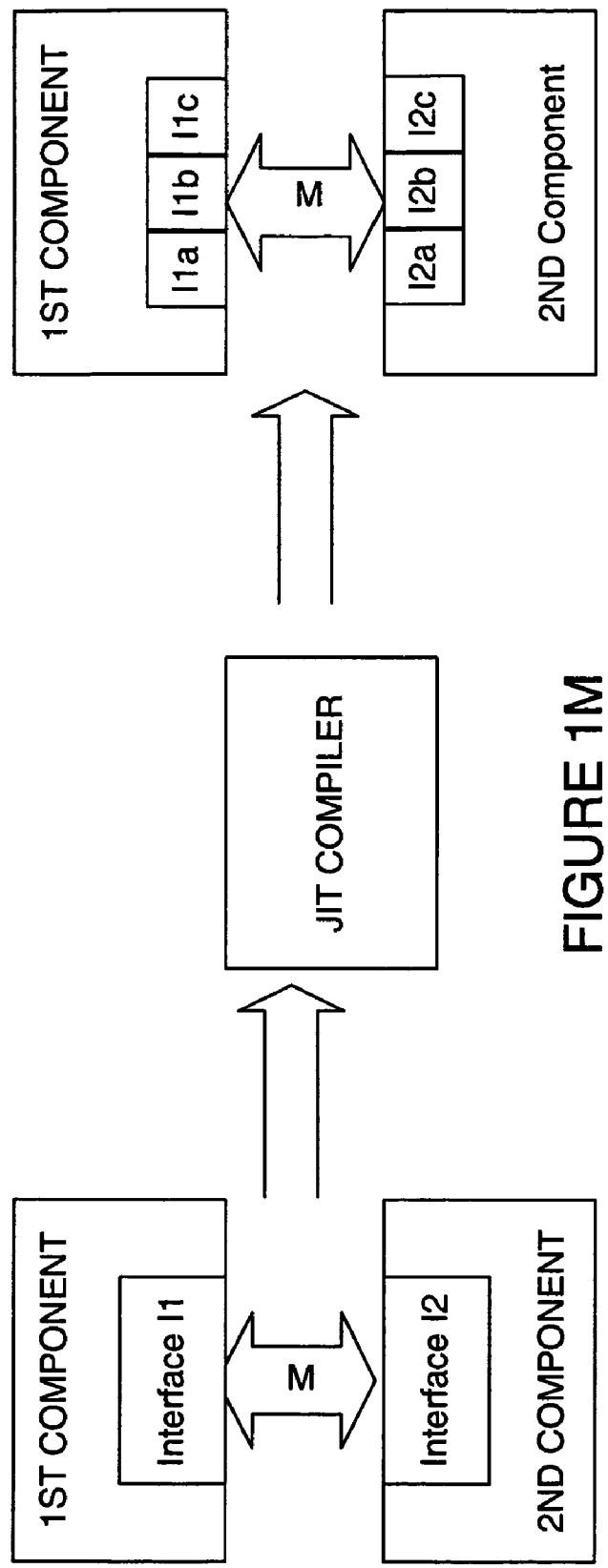

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the 1st Code Segment to the 2nd Code Segment, i.e., to conform them to a different interface as may be required by the 2nd Code Segment (either the original or a different 2nd Code Segment). This is depicted in FIGS. 1L and 1M. As can be seen in FIG. 1L, this approach is similar to the Divorce scenario described above. It might be done, e.g., where an installed base of applications are designed to communicate with an operating system in accordance with an Interface1 protocol, but then the operating system is changed to use a different interface. The JIT Compiler could be used to conform the communications on the fly from the installed-base applications to the new interface of the operating system. As depicted in FIG. 1M, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 1B and 1C. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

Figure 2A:
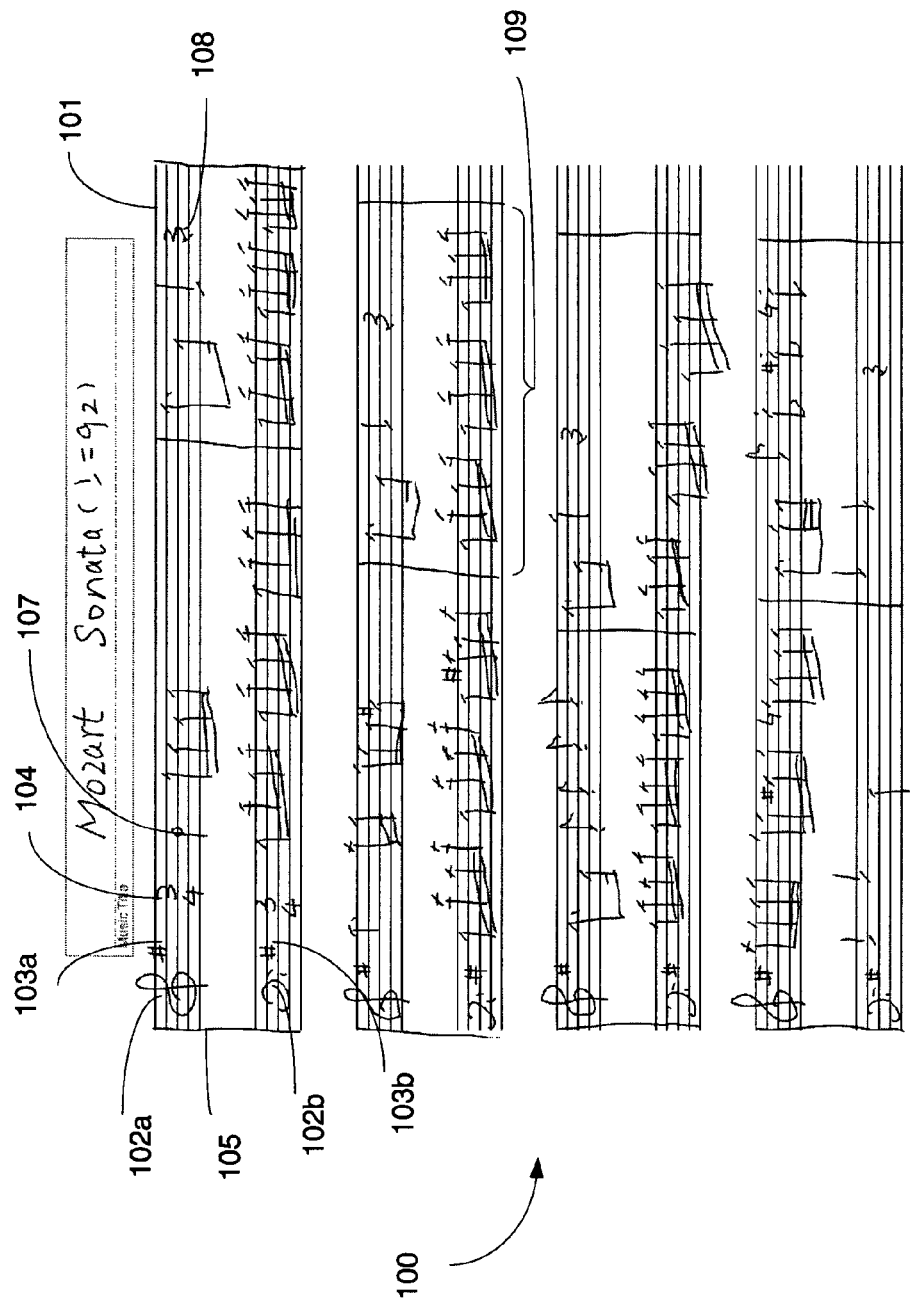
FIG. 2A illustrates an example of a handwritten music score, which is a solo score and has a treble clef and a bass clef part.
Figure 2B:
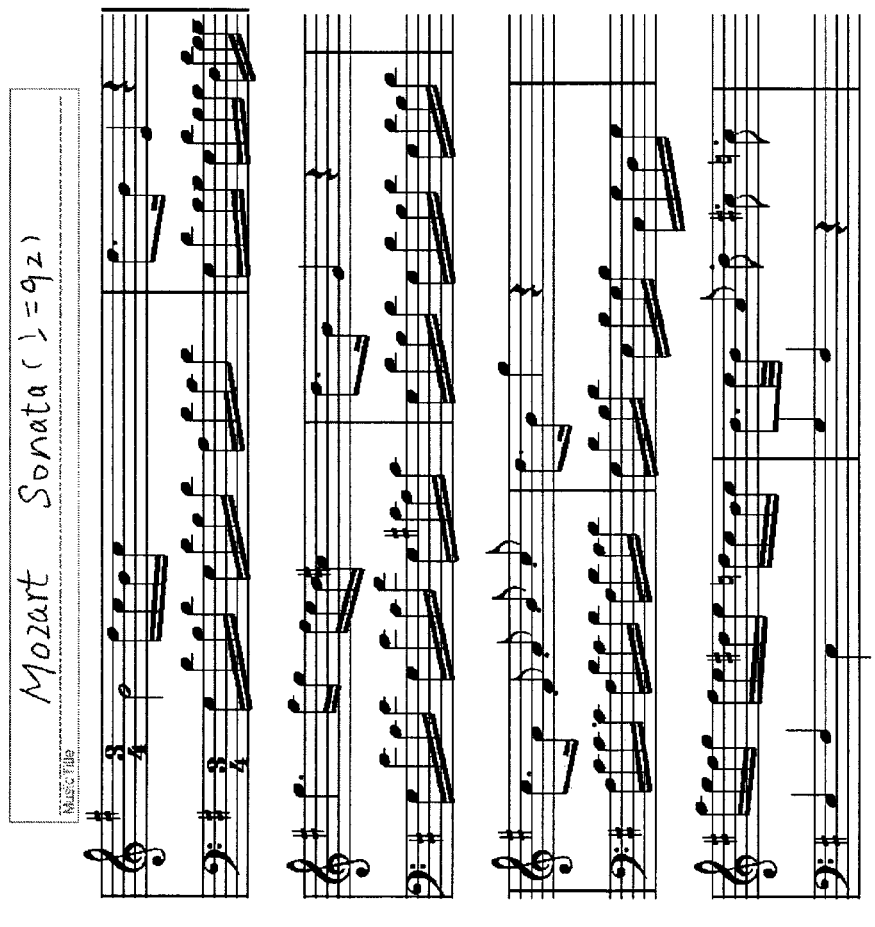
FIG. 2B illustrates an example of a recognition result of FIG. 2A in accordance with at least one aspect of the present invention.

Embodiments of the present invention provide a method and system for on-line recognition of music notations, where the musical notation set contains more than 90 characters. With this system, users can write music notes directly on a computer and the computer can automatically recognize the music notes and play the music based on the recognition results. FIG. 2A illustrates an example of a handwritten music score 100, which is a solo score having a treble clef and a bass clef part. Musicians write music scores on staffs 101 that are sets of five horizontal lines to represent a sequence of pitches. A music score often consists of many parts, for example, a score for symphony can have more than 10 parts. As described in more detail below, the inputs of a music recognizer may contain a set of staffs 102a and 102b determined by some page setting operations and the ink strokes written by the musicians. The outputs of the music recognizer in accordance with at least one aspect of the present invention may be the semantic representations of each part of the score, which can be converted to a sequence of midi instructions for playing back. Midi instructions are instructions for a computer program to implement a specific task. In this case, the midi instructions instruct a computer to process a music score for output to a speaker and/or a visual display device. For example, the first line of FIG. 2A is recognized to a stream of treble clef 102a, key signature 103a, time signature 104, half note 107, etc. FIG. 2B shows the recognition result 150 of FIG. 2A.

As shown in FIG. 2A, in a music score, there can be braces and brackets and straight line 105 at the beginning of the staff, which indicate that those staffs should be performed at the same time. In each staff there may be clef(s) 102a and 102b, key signatures 103a and 103b, time signature 104, and a series of notes 107 and 108 such as quarter-note, eighth-note, etc. To adjust the pitch, velocity and duration of a single note and describe the relationships between notes, some ornaments are used, such as slurs, staccato dots, augmentation dots, etc. The number of notes within a measure 109 is defined by the time signature 104. The rules and grammar of music notation and writing are well understood by those skilled in the art. Reference to each type of notation is not described herein as each are well known.

In music notation recognition, one problem to address is that the notations have high size variability. For example, an augmentation dot may be written only as a dot whereas a bracket may be written to cover many staffs. In accordance with at least one aspect of the present invention, music notations are categorized into one of seven groups based on the shapes, sizes and locations. Once again, these terms and symbols are well understood by those skilled in the art. The seven categories are:

1. A bar line that crosses two or more staffs, left and right repeats that cross two or more staffs, braces, brackets, staff lines
2. Notes with stems, such as a ½ note, a ¼ note, a ⅛ note, a 1/16 note, a 1/32 note, a 1/64 note, and a 1/128 note
3. Larger in notation size rests, such as a 1/32 rest, a 1/64 rest, and a 1/128 rest
4. Clefs, such as the treble, tenor, and bass clefs
5. A double whole note, a whole note, a digit one (such as sued in time signature notations), a ⅛ rest, and a 1/16 rest
6. Slurs, accents, turns, inverted turns, turn slashes, superior mordents, mordents, codas, grace note slashes, grace notes no slash, segno, staccato dots, staccato triangles, sforzato, staccato tripe tongues, sostenuto, fermata, ties, sharps, flats, and reverts
7. Other symbols: doubles sharp, a digit two, a digit three, a digit four, a digit five, a digit six, a digit seven, a digit eight, a digit nine, double flat, gliss, arpeggio, glissando up, glissando down, random time, bar line, double bar line, final bar line, left repeat, right repeat, augmentation dots, crescendo, decrescendo, ½ rest, and ¼ rest.

As described in more details below, in accordance with at least one aspect of the present invention, a method and system for recognizing handwritten notations is provided. Upon receipt of the handwritten notations, an initial step may be to sort the input strokes into a descending order of stroke length. As such, longer, continuous strokes are placed higher in the order compared to shorter or dot strokes. Aspects of the present invention then perform operations to recognize the notations within a current category based upon the descending order of strokes. The categories may be one or more of the seven notation categories identified above. Once the notations within a current category are recognized, the system then may perform the following steps to each notation within each category.

First, for each stroke $s_0$, nearby strokes of $s_0$ are grouped to make a stroke set S. Stroke set S may be sorted according to the distance a nearby stroke is from stroke $s_0$. Next, stroke set S is then compared against notations in the current category to determine whether it can be recognized. A system recognizer, in accordance with at least one aspect of the present invention, determines a list of candidate notations from the category. If the candidate list is empty, a last added nearby stroke of stroke set S may be removed and then the process may attempt to recognize the adjusted stroke set S'. This process may continue until the adjusted stroke set S' is empty of strokes. Finally, a music score may be generated where the recognized notations are sorted according to music rules and the integrity of the music score is checked against music grammars. For example, if the music score includes notations that are not consistent with allowed groupings of notations within one measure, the system may be configured to correct for the problem and/or alert a user of the problem.

Figures 3A, 3B:
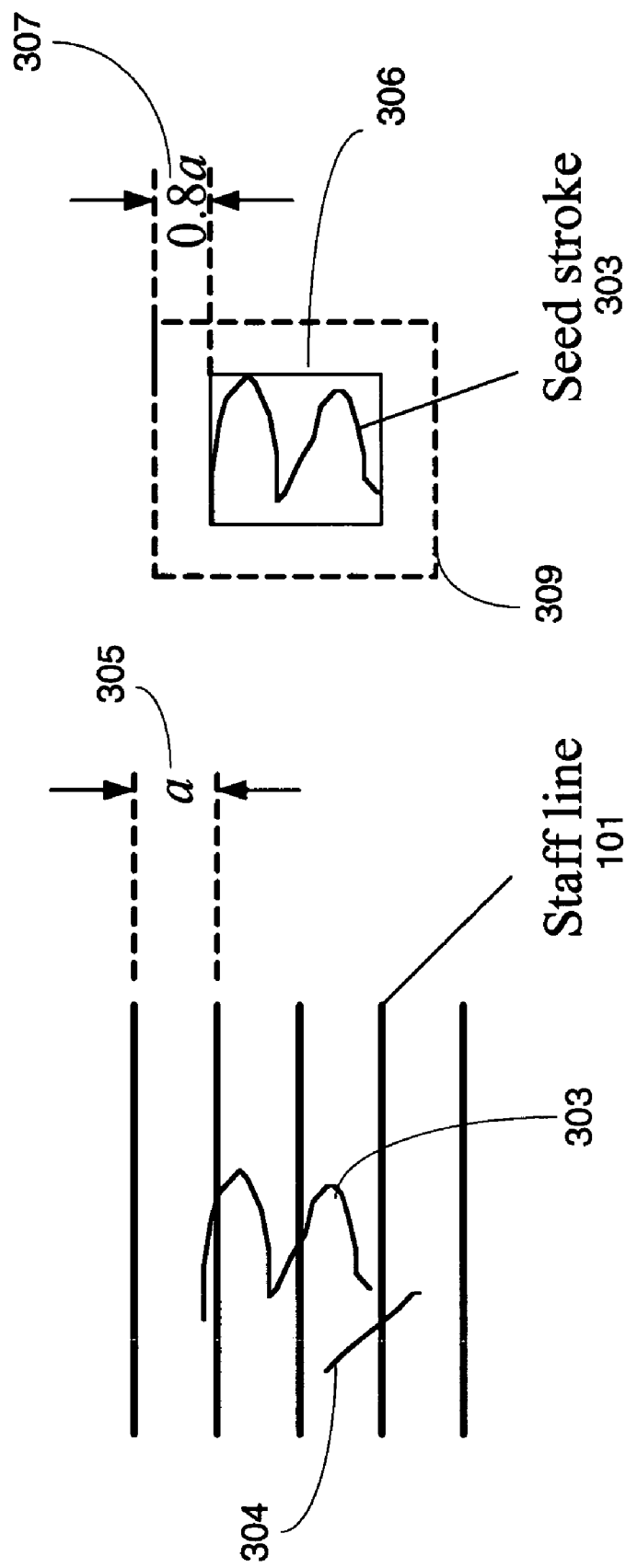
FIGS. 3A-3C illustrate an example of grouping of strokes in accordance with at least one aspect of the present invention.
Figure 3C:
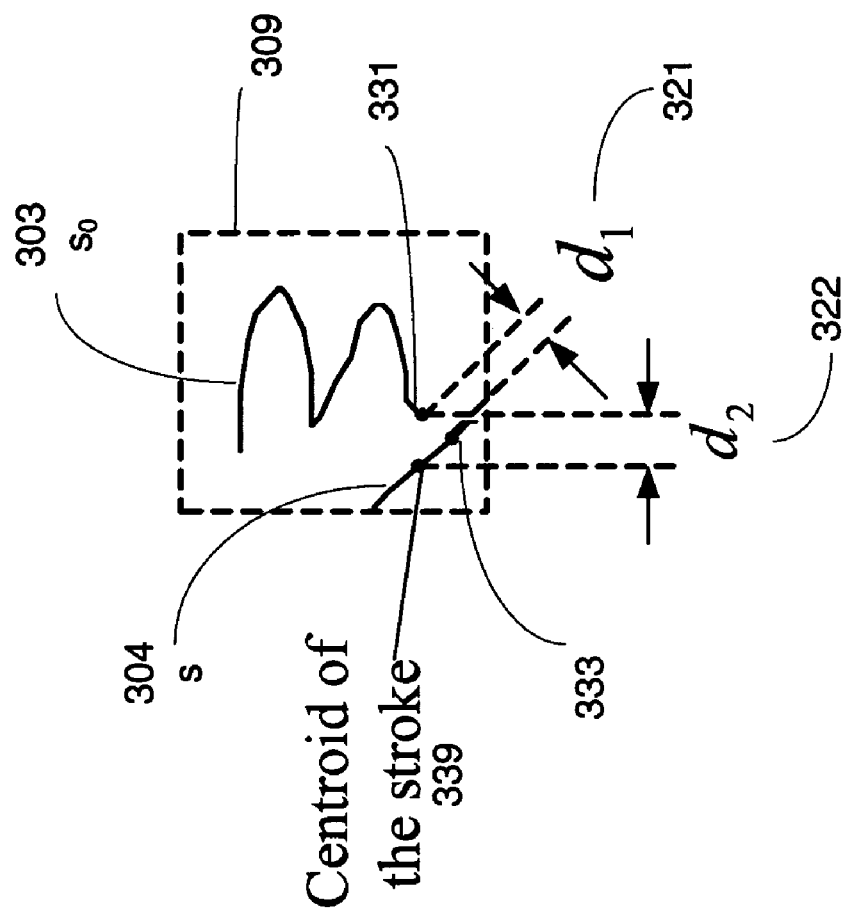

The task of grouping nearby strokes to make a stroke set S is to find the nearby strokes of a given "seed" stroke $s_0$. The grouping result of this process may include more strokes than a notation within a category. The steps for grouping nearby strokes to make a stroke set S may include one or more of the following steps. FIGS. 3A-3C illustrate an example of grouping of strokes in accordance with at least one aspect of the present invention. As shown in FIG. 3A, two strokes 303 and 304 are shown on staff lines 101. As used with reference to FIGS. 3A-3C, stroke 303 is a seed stroke and stroke 304 is a nearby stroke s. A seed stroke is a stroke in which nearby strokes, such as nearby stroke s, are grouped. Staff lines 101 are separated by a distance "a" 305. Distance a 305 may be defined by the fact that the staff lines 101 are always separated by a predefined distance. Alternatively, if the staff lines 101 are handwritten strokes, distance a 305 may be calculated as an average distance between staff lines 101 and/or a distance between staff lines 101 near seed stroke 303.

As shown in FIG. 3B, a bounding box 306 of the seed stroke $s_0$ 303 is determined and bounding box 306 then is expanded by a distance of multiplying distance a 305 by a threshold value 307. As used in this example, the threshold value is 0.8. It should be understood by those skilled in the art that the threshold value 307 could be greater than or less than 0.8. Expanded bounding box 309 is thus determined.

Referring to FIG. 3C, any unrecognized stroke that intersects the expanded bounding box 309 is considered a nearby stroke s 304. As shown, FIG. 3C includes one nearby stroke s 304. It should be understood that additional nearby strokes s may be included and that the present example of one nearby stroke s 304 does not limit the present invention to this example. The nearby strokes s 304 may then be sorted based upon the distance between the nearby stroke s 304 and the seed stroke $s_0$ 303. For each nearby stroke s 304 and the seed stroke $s_0$ 303, the distance d between the nearby stroke 304 and seed stroke $s_0$ 303 is defined as $d=(d_1+d_2)/2$. In this example and as shown in FIG. 3C, distance $d_1$ 321 is the minimum distance between an arbitrary point 331 of seed stroke $s_0$ 303 and an arbitrary point 333 of nearby stroke s 304. Distance $d_2$ 322 is the minimum distance between the arbitrary point 331 of seed stroke $s_0$ 303 and the centroid 339 of nearby stroke s 304. Stroke set S is defined as the seed stroke $s_0$ 303 and the nearby strokes s 304. Stroke set S may also be defined by a number of the order of nearby strokes s 304 so that the stroke set S may include the closest six nearby strokes s 304.

As described above, a notation recognition component compares a stroke set S against notations in a current category to determine whether the stroke set S can be recognized. The notation recognition component, in accordance with at least one aspect of the present invention, determines a list of candidate notations from the category. If the candidate list is empty, a last added nearby stroke of stroke set S may be removed and then the process may attempt to recognize the adjusted stroke set S'. This process may continue until the adjusted stroke set S' is empty of strokes. The notation recognition component may utilize one or both of two subsystems for recognizing different notations, a direct recognizer subsystem and a template matching recognizer subsystem.

Figure 4A:
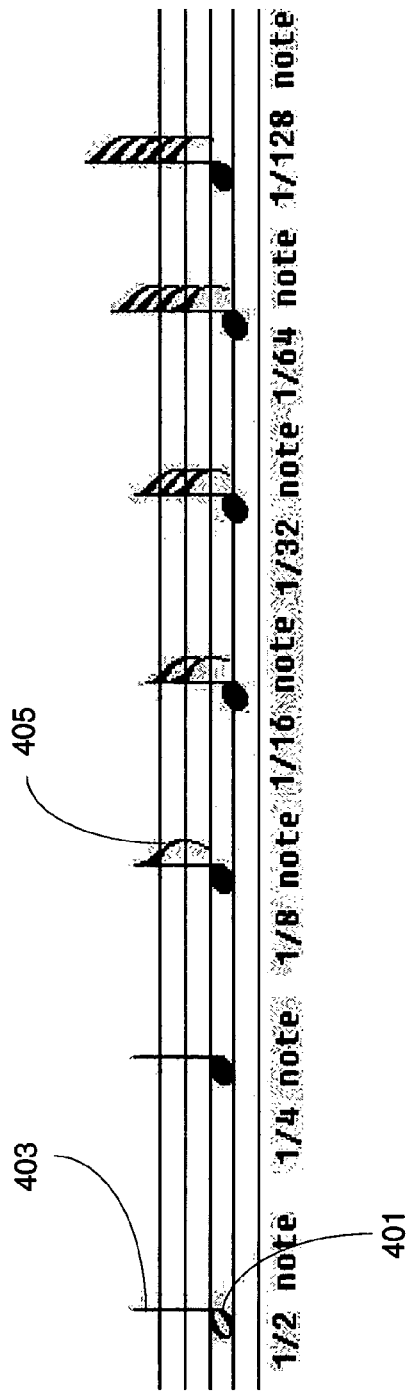
FIGS. 4A and 4B illustrate examples of music notes and music notes with common beams.
Figure 4B:
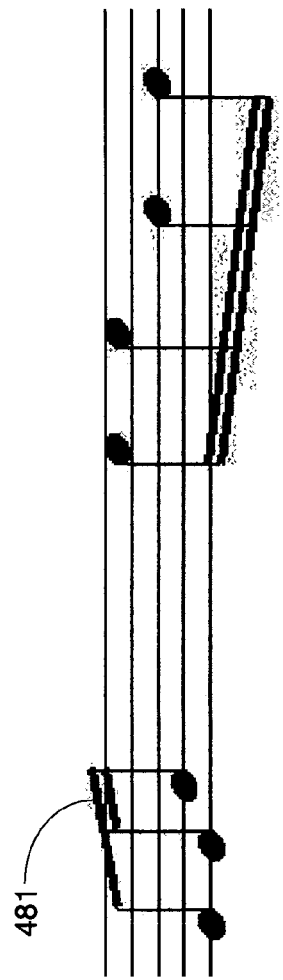

The direct recognizer subsystem is configured to recognize notations categorized within category 2 as described above, i.e., notes with stems, such as a ½ note, a ¼ note, a ⅛ note, a ¹⁄₁₆ note, a ¹⁄₃₂ note, a ¹⁄₆₄ note, and a ¹⁄₁₂₈ note. FIGS. 4A-4B illustrate examples of music notes and music notes with common beams. The direct recognizer subsystem may include one or more of the following steps. First, the first stroke in a stroke set is checked to determine whether it is a vertical line. This step may include checking the minimal bounding box of the stroke. If the ratio of the box's height and width is larger than a threshold number, such as 5, and the difference between the box's slant angle and the vertical axis is less than a threshold angle, such as 15 degrees, then the stroke may be considered a vertical line, a stem.

Next, the strokes near the top and bottom of the stem 403 are checked to determine the direction of the stroke. This step may include comparing the similarity of the stroke against a template note head 401 and a flag stroke(s) 405. In handwritten form, the note head is usually written as a slash-like stroke. Then, the pitch of the note is computed based upon the position of the note head 401. If the note head is out of the staff lines, the direct recognizer subsystem may determine the number of lines added between the note head and the staff to compute the pitch of the note. Finally, the duration of the note may be computed based upon the count of the flag stroke 405. If notes share common beams, such as shown in element 481 in FIG. 4B, the strokes corresponding to the common beam are associated with each other for determining the duration. In the direct recognizer subsystem, the candidate list only has one candidate notation.

The template matching recognizer subsystem is configured to recognize notations categorized within remaining categories 1 and 3-7 as described above. In accordance with at least one aspect of the present invention, a reference library is maintained. The reference library includes templates. The templates may be standard templates that are widely known and understood in the art for each notation. In the recognition process, a stroke set S is compared with each template in the library. In one embodiment, a string is used to represent each stroke and a band-limited time warping method is adopted for notation recognition. Time warping is a method to find the correspondence between two distorted strings. In one embodiment, an element in one string is allowed to map to one or more elements in another string, while preserving the order of the elements. It should be understood by those skilled in the art that time warping is but one method that may be used for computing the similarities between strings. Many different definitions of distance between strings, such as the Levenstein distance and discrete distance, may be used to compute the similarities between strings in template matching. These and other methods are well understood by those skilled in the art.

Figure 5:
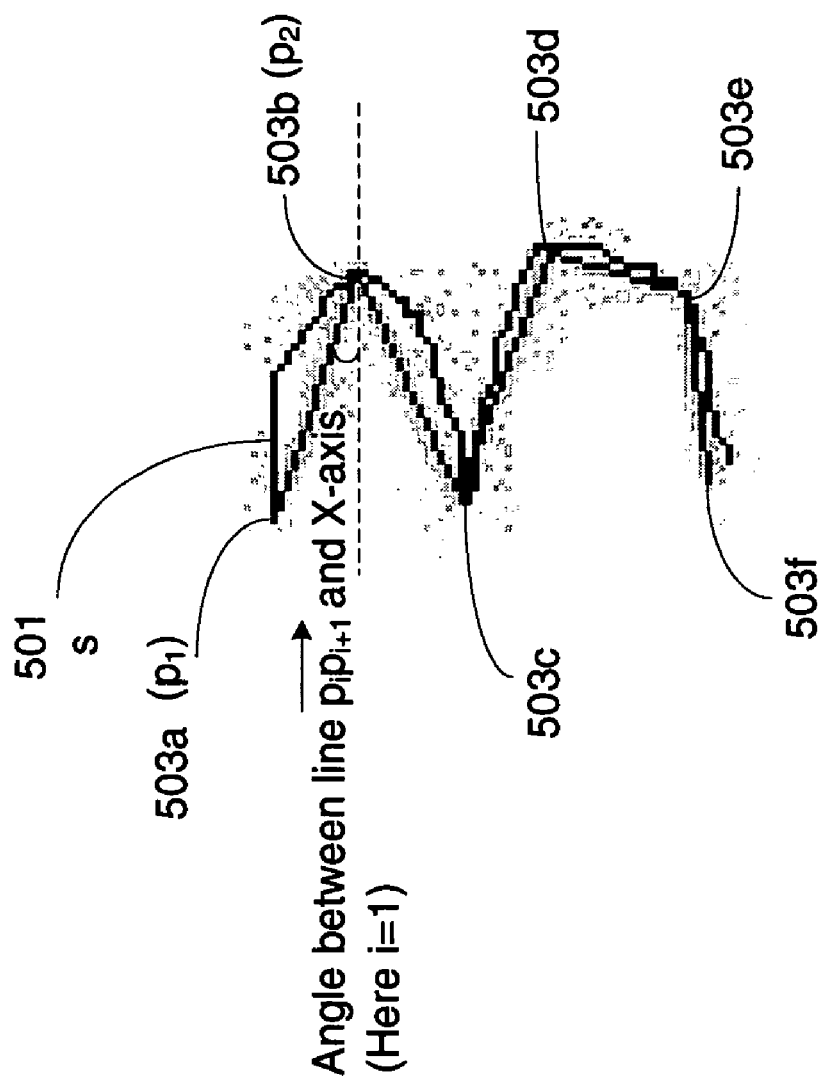
FIG. 5 illustrates an example of an original stroke and a simplified result in accordance with at least one aspect of the present invention.

The template matching recognizer subsystem is configured to utilize three phases for operation: feature extraction, stroke matching, and notation matching. In the feature extraction phase, each stroke is represented by a string of direction types. In one embodiment, Sklansky's polyline approximation, as described in Sklansky J. and Gonzalez V., *Fast Polygonal Approximation of Digitized Curves*, The Journal of the Pattern Recognition Society, Vol. 12, No. 5, pp. 327-331, 1980, may be used to simplify the strokes in order by removing the local fluctuations. FIG. 5 gives an example of a simplified result. It should be understood by those skilled in the art that other methods for polyline approximation may be used, including those described in Sezgin et al.; *Sketch Based Interfaces: Early Processing for Sketch Understanding*, Proceedings of the 2001 Workshop on Perceptual User interfaces (PUI'01), Orlando, Fla., pp. 623-641, May 2001.

After simplification, stroke s 501 is represented by $s = \vec{p_1 p_2} \ldots \vec{p_n}$, where $\vec{p_i}$ ($1 \leq i \leq n$) are the points of the simplified polyline. The direction of each pair of the neighboring points $\vec{p_i p_{i+1}}$ ($1 \leq i < n$) are classified into one of twelve (12) direction types defined by, $$\text{direction type} = \left\lfloor \frac{\text{Angle between line } \vec{p_i p_{i+1}} \text{ and } x\text{-axis}}{30} + 0.5 \right\rfloor \mod(12)$$

Figure 6:
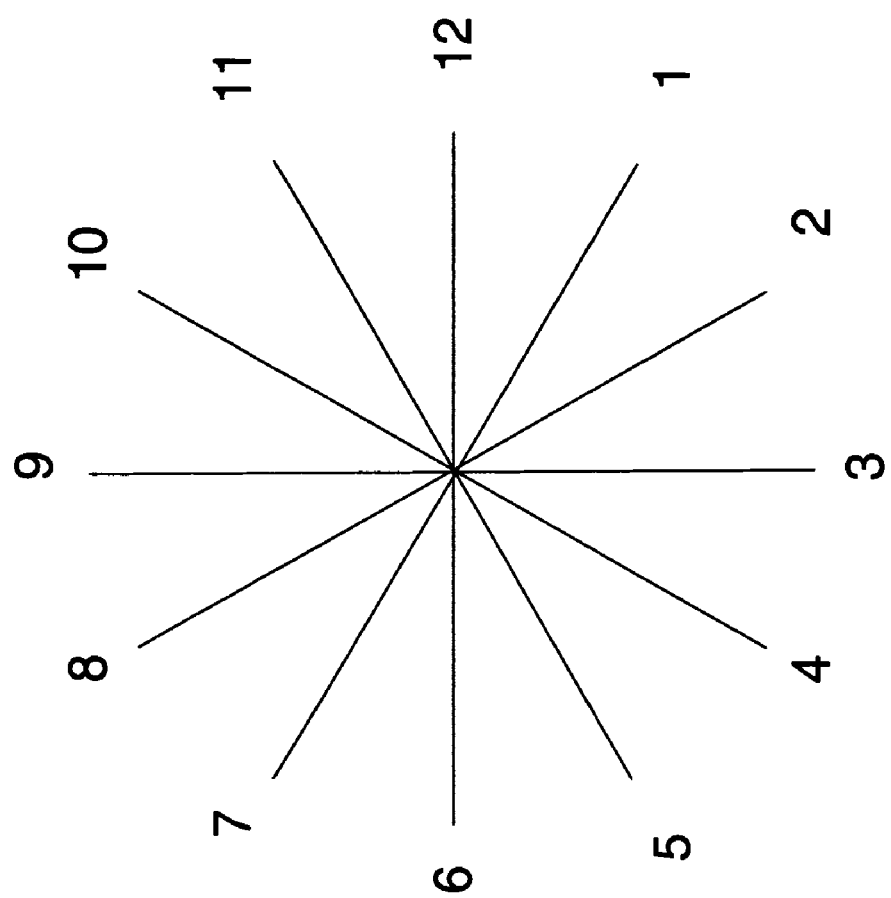
FIG. 6 illustrates an example of direction types in accordance with at least one aspect of the present invention.

In this way, a stroke s is represented by a string of the direction types. The string length for stroke with n points is n−1. As shown in FIG. 5, n=6 as stroke s 501 includes six (6) points 503a-503f and the string length is five (5). FIG. 6 provides an illustration of the direction types. It should be understood by those skilled in the art that fewer than twelve (12) or more than twelve (12) direction types may be used and that the present example does not limit the number of direction types used in accordance with the present invention to twelve (12).

The second phase is the stroke matching phase. Let $s_I$ and $s_T$ be the strings of an input stroke and a stroke in the template, $s_I = i_1 i_2 \ldots i_M$ and $s_T = r_1 r_2 \ldots r_N$. For use with a time warping method, the similarity between the elements of the strings is defined. In accordance with at least one aspect of the present invention, the similarity of two direction types is given with respect to lookup Table 1, where the first row and column are the direction types and the remaining cells are the similarity scores.

TABLE 1

Similarity scores between direction types

| | 1 | 2 | 3 | 4 | 5 | 6 | 7 | 8 | 9 | 10 | 11 | 12 |
|---|---|---|---|---|---|---|---|---|---|---|---|---|
| 1 | 1 | 0.7 | 0.2 | 0 | 0 | 0 | 0 | 0 | 0 | 0 | 0.2 | 0.7 |
| 2 | 0.7 | 1 | 0.7 | 0.2 | 0 | 0 | 0 | 0 | 0 | 0 | 0 | 0.2 |

TABLE 1-continued

Similarity scores between direction types

| | 1 | 2 | 3 | 4 | 5 | 6 | 7 | 8 | 9 | 10 | 11 | 12 |
|---|---|---|---|---|---|---|---|---|---|---|---|---|
| 3 | 0.2 | 0.7 | 1 | 0.7 | 0.2 | 0 | 0 | 0 | 0 | 0 | 0 | 0 |
| 4 | 0 | 0.2 | 0.7 | 1 | 0.7 | 0.2 | 0 | 0 | 0 | 0 | 0 | 0 |
| 5 | 0 | 0 | 0.2 | 0.7 | 1 | 0.7 | 0.2 | 0 | 0 | 0 | 0 | 0 |
| 6 | 0 | 0 | 0 | 0.2 | 0.7 | 1 | 0.7 | 0.2 | 0 | 0 | 0 | 0 |
| 7 | 0 | 0 | 0 | 0 | 0.2 | 0.7 | 1 | 0.7 | 0.2 | 0 | 0 | 0 |
| 8 | 0 | 0 | 0 | 0 | 0 | 0.2 | 0.7 | 1 | 0.7 | 0.2 | 0 | 0 |
| 9 | 0 | 0 | 0 | 0 | 0 | 0 | 0.2 | 0.7 | 1 | 0.7 | 0.2 | 0 |
| 10 | 0 | 0 | 0 | 0 | 0 | 0 | 0 | 0.2 | 0.7 | 1 | 0.7 | 0.2 |
| 11 | 0.2 | 0 | 0 | 0 | 0 | 0 | 0 | 0 | 0.2 | 0.7 | 1 | 0.7 |
| 12 | 0.7 | 0.2 | 0 | 0 | 0 | 0 | 0 | 0 | 0 | 0.2 | 0.7 | 1 |

Band-limited time warping only allows the direction types $i_j$ and $r_k$ to be matched based upon the constraint $|j-k| \leq 1$ ($1 \leq j \leq M, 1 \leq k \leq N$). In addition to this constraint, aspects of the system of the present invention use two additional constraints. First, $i_1$ must be mapped to $r_1$ and $i_M$ must be mapped to $r_N$. Second, neighboring pair direction types cannot be mapped to another neighboring pair, e.g., $(i_{j-1}, i_j)$ cannot be mapped to $(r_{k-1}, r_k)$. With the above three constraints, aspects of the present invention include five mapping types: $i_j$ to $r_k$, $i_j$ to $(r_{k-1}, r_k)$, $(i_{j-1}, i_j)$ to $r_k$, $(i_{j-1}, i_j, i_{j+1})$ to $(r_{k-1}, r_k)$ and $(i_{j-1}, i_j)$ to $(r_{k-1}, r_k, r_{k+1})$.

The similarity score of each mapping type is defined as below:

1. For mapping type: $i_j$ to $r_k$,
   Similarity($i_j, r_k$) can be determined directly from lookup Table 1.
2. For mapping type: $i_j$ to $(r_{k-1}, r_k)$,
   Similarity($i_j, (r_{k-1}, r_k)$)=0.8*max(Similarity($i_j, r_{k-1}$), Similarity($i_j, r_k$))+0.2*min(Similarity($i_j, r_{k-1}$), Similarity($i_j, r_k$))
3. For mapping type: $(i_{j-1}, i_j)$ to $r_k$,
   Similarity(($i_{j-1}, i_j$), $r_k$)=0.8*max(Similarity($i_{j-1}, r_k$), Similarity($i_j, r_k$))+0.2*min(Similarity($i_{j-1}, r_k$), Similarity($i_j, r_k$))
4. For mapping type: $(i_{j-1}, i_j, i_{j+1})$ to $(r_{k-1}, r_k)$,
   Similarity(($i_{j-1}, i_j, i_{j+1}$),($r_{k-1}, r_k$))=0.5*(0.8*max(Similarity($i_{j-1}, r_{k-1}$),Similarity($i_j, r_{k-1}$))+0.2*min(Similarity($i_{j-1}, r_{k-1}$), Similarity($i_j, r_{k-1}$)))+0.5*(0.8*max(Similarity($i_{j+1}, r_k$), Similarity($i_{j+1}, r_k$))+0.2*min(Similarity($i_{j+1}, r_k$), Similarity($i_{j+1}, r_k$)))
5. For mapping type: $(i_{j-1}, i_j)$ to $(r_{k-1}, r_k, r_{k+1})$,
   Similarity(($i_{j-1}, i_j$),($r_{k-1}, r_k, r_{k+1}$))=0.5*(0.8*max(Similarity($i_{j-1}, r_{k-1}$),Similarity($i_{j-1}, r_k$))+0.2*min(Similarity($i_{j-1}, r_{k-1}$), Similarity($i_{j-1}, r_k$)))+0.5*(0.8*max(Similarity($i_j, r_{k+1}$),Similarity($i_j, r_{k+1}$))+0.2*min(Similarity($i_j, r_{k+1}$), Similarity($i_j, r_{k+1}$)))

Figure 7:
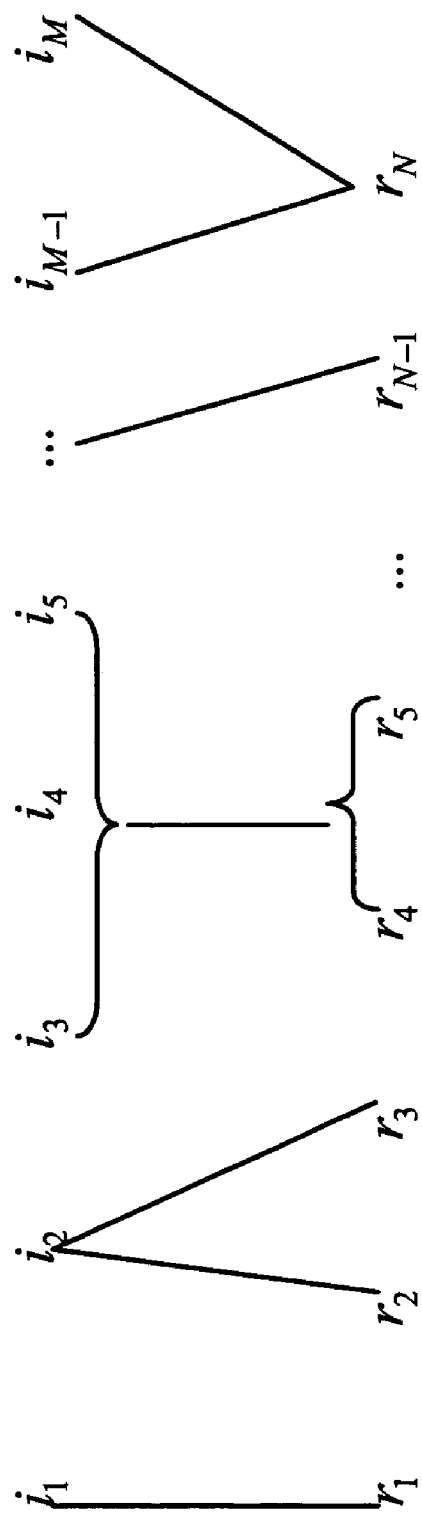
FIG. 7 illustrates an example of mappings between a string of an input stroke $s_I$ and a string of a template stroke $S_T$ in accordance with at least one aspect of the present invention.

The similarity score of two strings is defined to be the sum of each mapping's similarity score divided by the mapping count. For example, suppose the mapping between string $s_I$ and $s_T$ is shown as in FIG. 7. In such an example, the similarity between $s_I$ and $s_T$ is Similarity($s_I, s_T$) = (Similarity($i_1, r_1$) + Similarity($i_2, (r_2, r_3)$) + Similarity(($i_3, i_4, i_5$), ($r_4, r_5$) + ... + Similarity(($i_{M-1}, i_M$), $r_N$))/K where K is the mapping count.

The time warping method then is used to compute the maximal similarity score between the two strings.

The final phase, the notation matching phase, is now described. Let $S_I=\{s_{I_1}, s_{I_2}, \ldots, s_{I_x}\}$ and $S_T=\{s_{T_1}, s_{T_2}, \ldots, s_{T_y}\}$ be the input stroke set and the stroke set of a template, respectively. The similarity between the two strokes sets $S_I$ and $S_T$ is defined as:

$$\text{Similarity}(S_I, S_T) = \begin{cases} 0 & (x \neq y) \\ \max\left(\frac{1}{x} \sum_{(I_i, T_j)} \text{Similarity}(s_{I_i}, s_{T_j})\right) & (x = y) \end{cases}$$

where $(s_{I_i}, s_{T_j})$ is the one to one match between the two stroke sets.

In the recognition process, the input stroke set $S_I$ is compared with each template in the library. If the largest similarity score between the input stroke set $S_I$ and all templates of one notation is larger than a recognition threshold value, the notation is added to a candidate list. In one embodiment, the recognition threshold value is 0.5. Upon matching each template, the candidate list is sorted into a descending order of the similarity scores.

A music score generation component generates a music score based on all recognized notations by the direct recognizer subsystem and the template matching recognizer subsystem. A computer application may then be configured to output to an output device, such as a speaker and/or a visual device, music tones and/or visual displays corresponding to the music notations of the music score. The notations are sorted according to their respective position in the staff lines and a first candidate of each notation from the respective candidate lists is chosen to construct the score. In the direct recognizer subsystem, the candidate list only has one candidate notation. There are certain music grammars which can be used to improve the recognition results. In accordance with at least aspect of the present invention, the music grammar may be checked on the recognition results in turn. If one notation conflicts with the music grammar, the next candidate from the list is checked until the candidate list is empty. If no candidate complies with the music grammar, the notation is deleted. Such may be the case with an errant mark by a user. Examples of music grammar that may be used in accordance with aspects of the present invention include:
1. Key signature
2. Time signature, including combining several digits into one time signature
3. Repeat FIGS.
4. Accidentals
5. Dots
6. Staccato and other performance symbols
7. Curve lines The invention may assume different forms of implementation, including modules utilizing computer-readable media and modules utilizing specialized hardware such as an application specific integrated circuit (ASIC).

Figure 8:
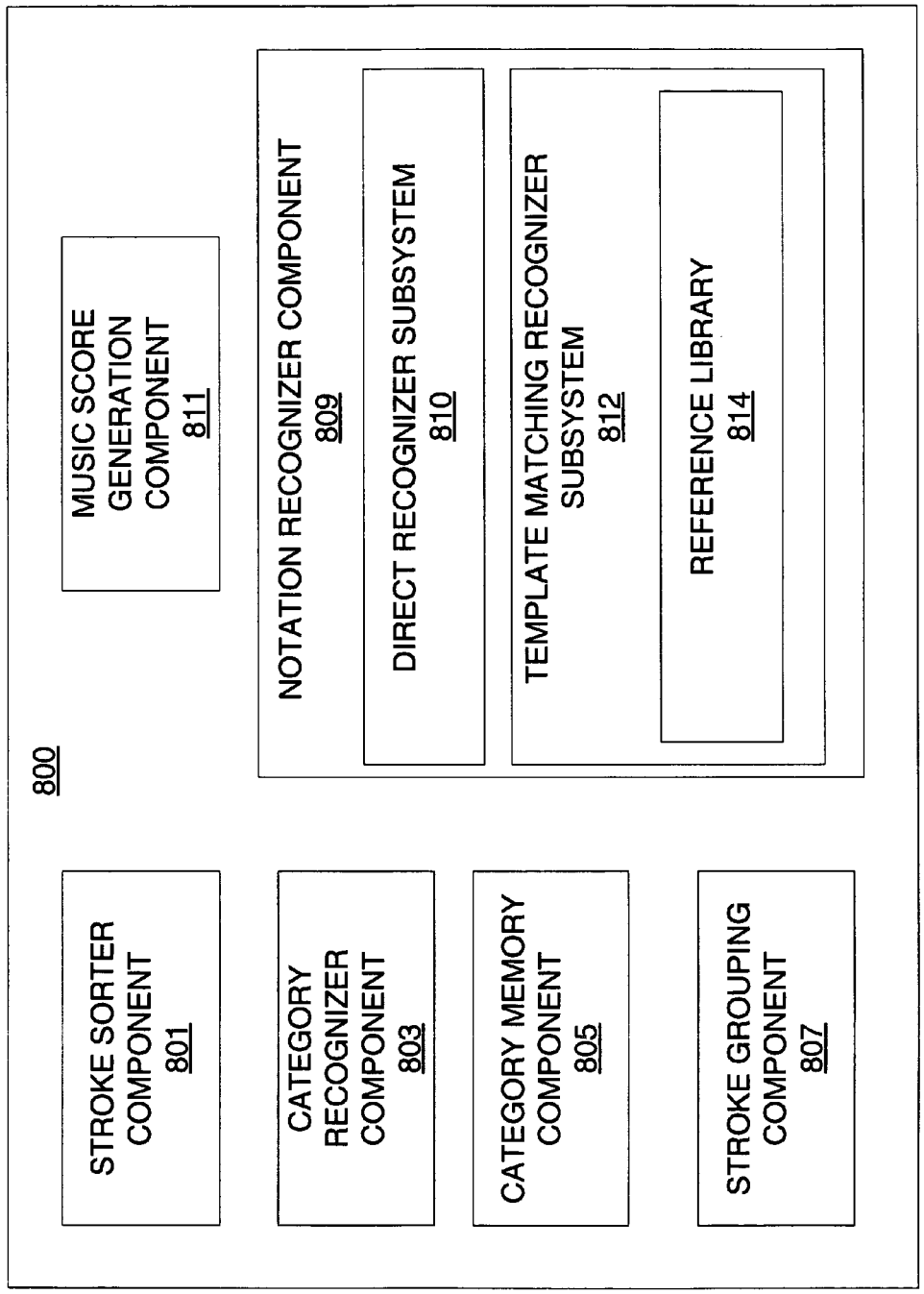
FIG. 8 is a block diagram of an illustrative example of a system for recognition of handwritten music notations in accordance with at least one aspect of the present invention.

FIG. 8 is a block diagram of an illustrative example of a system 800 for recognition of handwritten music notations in accordance with at least one aspect of the present invention. As shown, system 800 includes a stroke sorter component 801. Stroke sorter component may be configured to sort input strokes received by the system 800 into some order. The order may be based upon a descending order of stroke length of the input strokes. In such an example, longer, continuous strokes may be placed higher in the order compared to shorter strokes or dot strokes. Category recognizer component 803 may be configured to recognize the notations within a category. The notation categories may be maintained within a category memory component 805. Stroke grouping component 807 may be configured to group strokes that are nearby a seed stroke into a stroke set. The nearby strokes may be grouped with the seed stroke according to some variable, such as the distance between the nearby stroke and the seed stroke.

System 800 is shown also to include a notation recognizer component 809. Notation recognizer component 809 may be configured to compare the stroke set with notations in a category to determine whether the stroke set can be recognized as a notation. Notation recognizer component 809 may be configured to provide a candidate list of one or more notations that the system 800 has recognized as a possible notation associated with the stroke set. Notation recognizer component 809 may be configured to include a direct recognizer subsystem 810 and a template matching recognizer subsystem 812. Direct recognizer subsystem 810 may be configured to recognize notations with stems, e.g., quarter notes, eighth notes, etc. Direct recognizer subsystem 810 further may be configured to determine the notes pitch and duration. Template matching recognizer subsystem 812 may be configured to recognize all other notations, such as rests, clefs, key signatures, time signatures, etc. Template matching recognizer subsystem 812 may include a reference library 814 to maintain the templates. Template matching recognizer subsystem 812 further may be configured to determine a pitch, as necessary, and a duration, as necessary, depending on the notation recognized.

Music score generation component 811 is configured to generate a music score based upon all recognized notations within the various candidate lists. Music score generation component 811 further may be configured to improve the recognition results by applying music rules and grammar to generate the music score.

Figure 9:
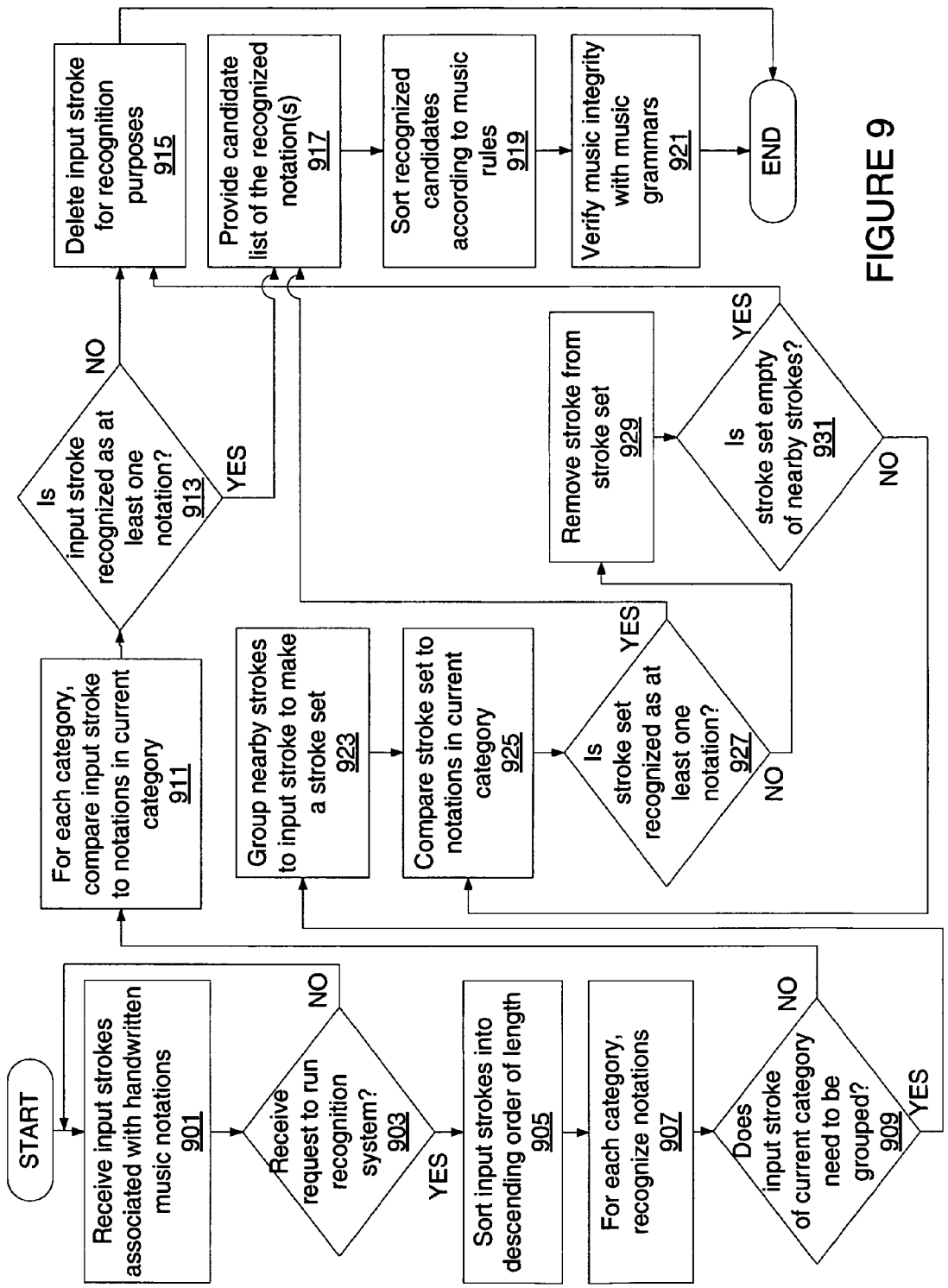
FIG. 9 is a flowchart of another illustrative example of a method for recognition handwritten music notations to produce a music score in accordance with at least one aspect of the present invention.

FIG. 9 is a flowchart of another illustrative example of a method for recognizing handwritten music notations to produce a music score in accordance with at least one aspect of the present invention. The process starts at step 901 where input strokes associated with handwritten music notations are received. At step 903, a determination is made as to whether an input has been received to run a handwritten music recognition system. If no, the system returns to step 901. If an input is received to run the handwritten music recognition system in step 903, the process moves to step 905 where the input strokes are sorted into descending order of length. It should be understood that other orders may be used and that the example shown does not limit the present invention.

At step 907, for each category, notations within the category are recognized. For example, the categories may be one or more of the seven notation categories described above. Proceeding to step 909, a determination is made as to whether an input stroke for a current category needs to be grouped with other nearby strokes. If yes, the process moves to step 923 as described below. If no, at step 911, the input stroke is compared to notations in a current category for each category. Proceeding to step 913, a determination is made as to whether the input stroke is recognized as at least one notation within the current category. If not, the input stroke is deleted for recognition purposes at step 915 and the process ends. If the input stroke is recognized as at least one notation in step 913, the process proceeds to step 917 where a candidate list of the recognized notation(s) are provided. The recognized candidates are sorted in accordance with music rules in step 919 and the music integrity is verified in accordance with music grammar in step 921 before the process ends.

Returning to the description of step 909, if the input stroke of a current category needs to be grouped with other nearby strokes, the process proceeds to step 923 where nearby strokes are grouped to the input stroke to make a stroke set. Methods for grouping may be as described herein above. At step 925, the stroke set is compared to notations within the current category. Proceeding to step 927, a determination is made as to whether the stroke set is recognized as at least one notation within the category. If yes, the process proceeds to step 917 where a candidate list of the recognized notations are provided and the process continues as described above. If the stoke set is not recognized as at least one notation in step 927, the process proceeds to step 929 where one stroke of the nearby strokes in the stroke set is removed. At step 931, a determination is made as to whether the stroke set is empty of nearby strokes. If not, the process returns to step 925. If so, the process proceeds to step 915 where the remaining input stroke is deleted and the process ends.

Figure 10:
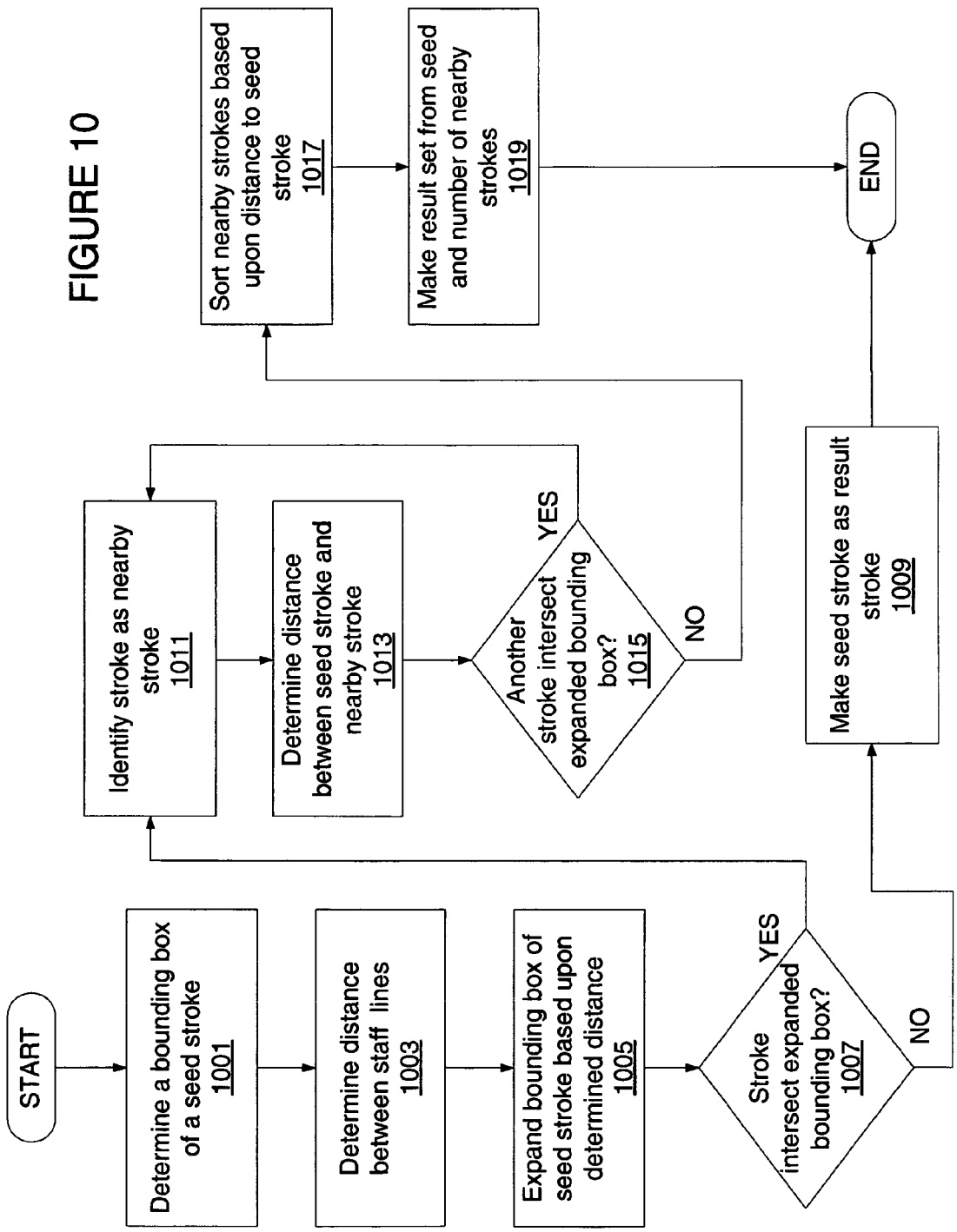
FIG. 10 is a flowchart of another illustrative example of a method for grouping strokes for recognizing handwritten music notations in accordance with at least one aspect of the present invention.

FIG. 10 is a flowchart of another illustrative example of a method for grouping strokes for recognizing handwritten music notations in accordance with at least one aspect of the present invention. The process starts at step 1001 where a bounding box of a seed stroke is determined. The bounding box of the seed stroke may be the minimal rectangular area to enclose the seed stroke. At step 1003, the distance between two staff lines is determined as a variable "a." Proceeding to step 1005, the bounding box of the seed stroke is expanded based upon the determined distance "a." The bounding box may be expanded in accordance with a threshold value, such as 0.8. As such, the bounding box of the seed stroke may be expanded by a threshold value of the distance "a." At step 1007, a determination is made as to whether a stroke intersects the expanded bounding box of the seed stroke. If not, the process proceeds to step 1009 where a result stroke is made including the seed stroke only.

If a stroke does intersect the bounding box at step 1007, the process proceeds to step 1011 where the intersecting stroke is identified as a nearby stroke of the seed stroke. At step 1013, the distance between the seed stroke and the nearby stroke is determined. Methods for determining the distance are described herein above. Moving to step 1015, a determination is made as to whether another stroke intersects the expanded bounding box of the seed stroke. If yes, the process returns to step 1011 with respect to the new nearby stroke. If another stroke does not intersect the expanded bounding box of the seed stroke at step 1015, the process moves to step 1017 where the nearby strokes are sorted based upon the respective distance to the seed stroke, e.g., shortest distance to longest distance. At step 1019, a result stroke is made, including the seed stroke and a number of nearby strokes in accordance with the sorted order of nearby strokes. For example, the result set may be configured to include the seed stroke and the six (6) closest nearby strokes.

Figure 11:
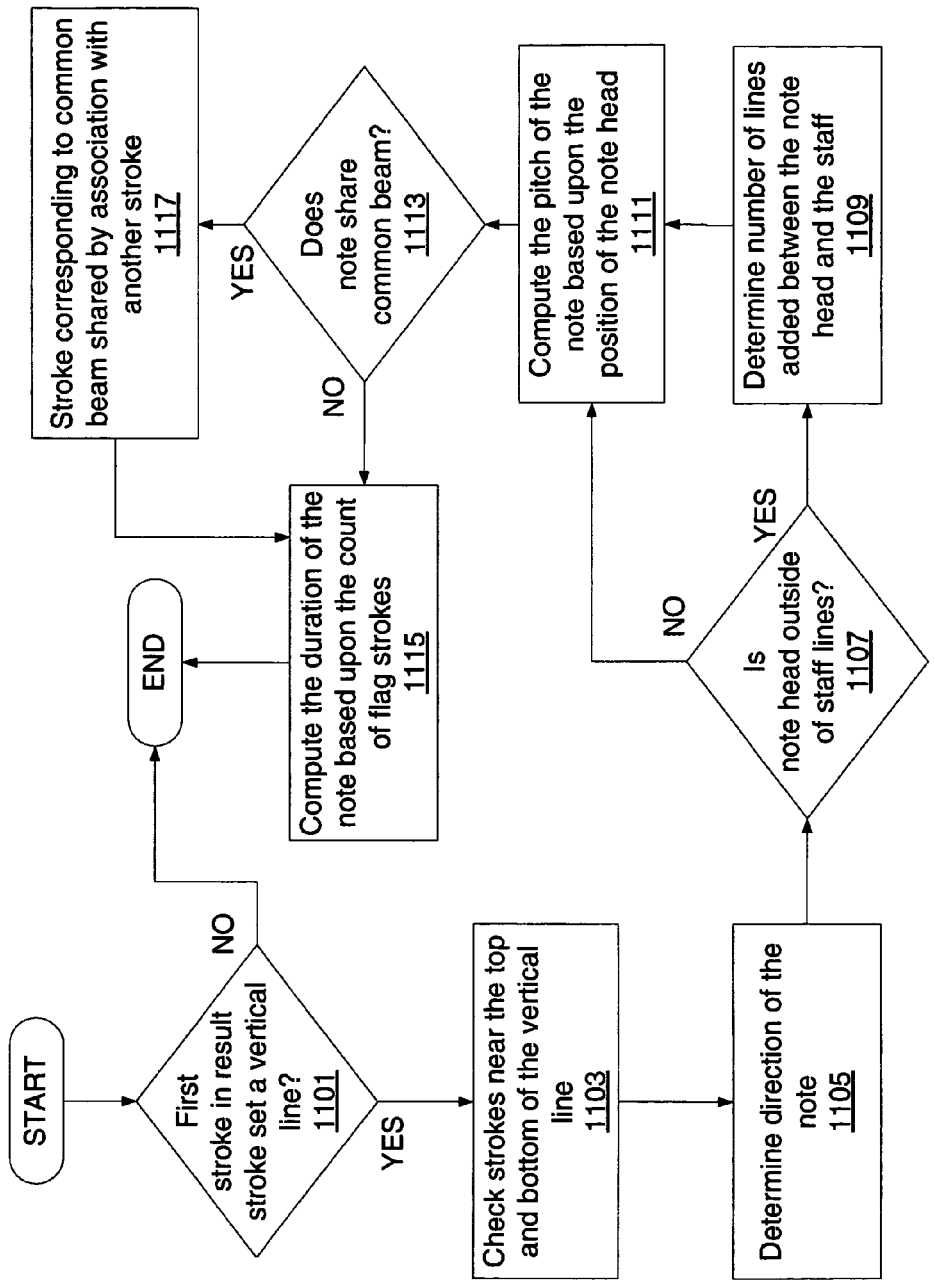
FIG. 11 is a flowchart of another illustrative example of a method for recognizing handwritten music notes in accordance with at least one aspect of the present invention.

FIG. 11 is a flowchart of another illustrative example of a method for recognizing handwritten music notes in accordance with at least one aspect of the present invention. The process starts at step 1101 where a determination is made as to whether a first stroke in a result stroke set is a vertical line. The methods for determining whether a first stroke is a vertical line are described herein above. If not, the process ends. If so, at step 1103, other strokes near the top and the bottom of the vertical line, first stroke, are checked. The system may be configured to identify the notation as a note with a stem when a vertical line is determined. At step 1105, the direction of the note is determined. Proceeding to step 1107, a determination is made as to whether the note head of the note is outside of the staff lines. If not, the process proceeds to step 1111 as described below. If the note head is outside the staff lines at step 1107, at step 1109, the number of lines added between the note head and the staff are determined.

Proceeding to step 1111, the pitch of the note is computed based upon the position of the note head with reference to the staff lines. At step 1113, a determination is made as to whether the note shares a common beam with at least one other note. If not, the process proceeds to step 1115 where the duration of the note is computed based upon the count of the flag strokes and the process ends. If the note does share a common beam in step 1113, the process moves to step 1117 where a stroke corresponding to the common beam is shared by association with the at least one other stroke. As such, when the duration of the at least one other note is computed, its association with the present note may be known. From step 117, the process proceeds to step 1115 where the duration of the note, in this case with reference to the common beam, is computed and the process ends.

FIG. 12 is a flowchart of another illustrative example of a method for recognizing handwritten music notations in accordance with at least one aspect of the present invention. The process starts at step 1201 where each input stroke is represented as a string of direction types. At step 1203, the similarity score between a string of an input stroke and a string of a stroke in a template is determined. Methods for determining the similarity score are described herein above. Proceeding to step 1205, an input stroke set of the strings of input strokes is compared with a template string set for each notation template. At step 1207, a determination is made as to whether the largest similarity score between the input stroke set and each template of one notation is greater than a recognition threshold. For example, the recognition threshold may be 0.5.

If the largest similarity score between the input stroke set and each template of one notation is not greater than a recognition threshold, the process ends. If so, the process moves to step 1209 where the one notation is added to a candidate list of recognized notations that may be associated with a handwritten stroke. At step 1211, a determination is made as to whether another template needs to be compared with the input stroke set. If so, the process returns to step 1207 for the other notation template. If not, the process proceeds to step 1213 where the candidate list of notation(s) are sorted into a descending order of similarity score and the process ends.

With respect to an application programming interface (API), various aspects of the present invention may be performed by an API. For example, public APIs may interface with an operating system to allow the operating system to provide the various features of the present invention. In one embodiment, a software architecture for processing data representative of handwritten notations may include a component configured to recognize the handwritten notations and an application program interface to access the component. An API may receive a request to recognize handwritten notations, access the necessary function(s) to perform the operation, and then send the results back to an operating system. The operating system may use the data provided from the API to perform the various features of the present invention.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

We claim:

1. A method for recognizing handwritten music notes, the method comprising steps of:
   recognizing notations within a notation category;
   receiving a plurality of input strokes corresponding to handwritten music notations;
   grouping nearby strokes to a first input stroke of the plurality of input strokes to make a stroke set;
   comparing the stroke set with the notations in the notation category;
   determining whether the stroke set is recognized as at least one candidate notation within the notation category;
   providing a candidate list of recognized candidate notations; and
   generating a music score based upon the recognized candidate notations wherein upon determining that the stroke set is not recognized as at least one candidate notation, the method further comprising steps of:
   removing at least one of the nearby strokes from the stroke set;
   determining whether the modified stroke set contains nearby strokes;
   upon determining that the modified stroke set contains nearby strokes, comparing the modified stroke set with the notations in the notation category and determining whether the modified stroke set is recognized as at least one candidate notation within the notation category; and
   upon determining that the modified stroke set does not contain any nearby strokes, deleting the first input stroke.

2. The method of claim 1, further comprising a step of receiving a request to initiate a handwritten music notation recognition system.

3. The method of claim 1, further comprising a step of sorting the plurality of input strokes into a descending order of stroke length.

4. The method of claim 1, further comprising a step of sorting the recognized candidate notations according to music rules.

5. The method of claim 1, further comprising a step of verifying the music score according to music grammars.

6. The method of claim 1, further comprising a step of repeating each step for a second notation category.

7. A computer-readable medium comprising a series of computer-executable instructions for performing the steps of claim 1.

8. A method for recognizing handwritten music notes, the method comprising steps of:
   recognizing notations within a notation category;
   receiving a plurality of input strokes corresponding to handwritten music notations;
   grouping nearby strokes to a first input stroke of the plurality of input strokes to make a stroke set;
   comparing the stroke set with the notations in the notation category;
   determining whether the stroke set is recognized as at least one candidate notation within the notation category;
   providing a candidate list of recognized candidate notations; and
   generating a music score based upon the recognized candidate notations wherein the step of grouping includes steps of:
   determining a bounding box of the first input stroke; determining a distance between staff lines;
   expanding the bounding box based upon the determined distance;
   identifying the nearby strokes that intersects the expanded bounding box; and
   making the stroke set including the first input stroke and the nearby strokes.

9. The method of claim 8, further comprising steps of:
   determining a distance, for each nearby stroke, between the first input stroke and the nearby stroke; and
   sorting the nearby strokes based upon the determined distance between the first input stroke and the nearby stroke, wherein the step of making the stroke set is based upon the sorted nearby strokes.

10. A method for recognizing handwritten music notes, the method comprising steps of:
    recognizing notations within a notation category;
    receiving a plurality of input strokes corresponding to handwritten music notations;
    grouping nearby strokes to a first input stroke of the plurality of input strokes to make a stroke set;
    comparing the stroke set with the notations in the notation category;
    determining whether the stroke set is recognized as at least one candidate notation within the notation category;
    providing a candidate list of recognized candidate notations; and
    generating a music score based upon the recognized candidate notations wherein the step of determining whether the stroke set is recognized as at least one candidate notation within the notation category includes steps of:
    determining the stroke set to be a note with a stem;
    determining the direction of the note;
    computing the pitch of the note based upon a position of the note head with reference to a staff; and
    computing the duration of the note and further comprising a step of determining whether the note shares a common beam, wherein the step of computing the duration of the note is based upon the determination that the note does share a common beam.

11. A method for recognizing handwritten music notes, the method comprising steps of:
    recognizing notations within a notation category;
    receiving a plurality of input strokes corresponding to handwritten music notations;
    grouping nearby strokes to a first input stroke of the plurality of input strokes to make a stroke set;
    comparing the stroke set with the notations in the notation category;
    determining whether the stroke set is recognized as at least one candidate notation within the notation category;
    providing a candidate list of recognized candidate notations; and
    generating a music score based upon the recognized candidate notations wherein the step of determining whether the stroke set is recognized as at least one candidate notation within the notation category includes steps of:
    representing each of the first input stroke and the nearby strokes of the stroke set as a string of direction types;

comparing the stroke set with each notation within the notation category;

determining whether a similarity score between the stroke set and at least one notation within the notation category is greater than a recognition threshold; and upon determining that the similarity score is greater than the recognition threshold; identifying the at least one notation as a recognized candidate notation.

12. The method of claim 11, further comprising a step of determining a similarity score between each string of direction types and another string of direction types corresponding to a stroke in a notation template.

13. The method of claim 11, further comprising a step of sorting the candidate list into a descending order of similarity scores.

* * * * *